US012637484B2

(12) United States Patent
Rix et al.

(10) Patent No.: US 12,637,484 B2
(45) Date of Patent: May 26, 2026

(54) TOLUENE FREE PREPARATION OF SMAO: HEATING WITH TMA TO IMPROVE ACTIVITY

(71) Applicant: ExxonMobil Chemical Patents Inc., Baytown, TX (US)

(72) Inventors: Francis C. Rix, Houston, TX (US); Lubin Luo, Houston, TX (US); Ky Ka Le, Pearland, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 426 days.

(21) Appl. No.: 18/249,303

(22) PCT Filed: Nov. 17, 2021

(86) PCT No.: PCT/US2021/059626
§ 371 (c)(1),
(2) Date: Apr. 17, 2023

(87) PCT Pub. No.: WO2022/108969
PCT Pub. Date: May 27, 2022

(65) Prior Publication Data
US 2023/0391801 A1      Dec. 7, 2023

Related U.S. Application Data

(60) Provisional application No. 63/117,295, filed on Nov. 23, 2020.

(51) Int. Cl.
*C07F 5/06* (2006.01)
*C08F 110/14* (2006.01)
*C08F 210/16* (2006.01)

(52) U.S. Cl.
CPC ............ *C07F 5/068* (2013.01); *C08F 110/14* (2013.01); *C08F 210/16* (2013.01)

(58) Field of Classification Search
None
See application file for complete search history.

(56) References Cited

U.S. PATENT DOCUMENTS 4,912,075 A    3/1990  Chang
5,086,025 A  * 2/1992  Chang ..................... C08F 10/00
                                                          502/103

2001/0044374 A1 * 11/2001  Payne ..................... C08F 10/00
                                                          502/103
2019/0127497 A1    5/2019  Luo et al.
2019/0127499 A1    5/2019  Harlan et al.
2021/0179743 A1    6/2021  Berg et al.

FOREIGN PATENT DOCUMENTS

WO         2019089144 A1    5/2019

OTHER PUBLICATIONS

Hlatky, G. (2000) "Heterogeneous Single-Site Catalysts for Olefin Polymerization," Chem. Rev., v.100, pp. 1347-1376.
Fink, G. et. al. (2000) "Propene Polymerization with Silica-Supported Metallocene/MAO Catalysts," Chem. Rev., v. 100 (4), pp. 1377-1390.
Severn, J. R. et al. (2005) "Bound but Not Gagged-Immobilizing Single-Site α-Olefin Polymerization Catalysts," Chem. Rev., v.105, pp. 4073-4147.
Zjilstra, H. S. et. al. (2015) "Methylalumoxane—History, Production, Properties, and Applications," Eur. J. Inorg. Chem., v.2015(1), pp. 19-43.
Imhoff, D. W. et al. (1998) "Characterization of Methylaluminoxanes and Determination of Trimethylaluminum Using Proton NMR," Organometallics, v. 17(10), pp. 1941-1945.
Ghiotto, F. et al. (2013) "Probing the Structure of Methylalumoxane (MAO) by a Combined Chemical, Spectroscopic, Neutron Scattering, and Computational Approach," Organometallics, v.32(11), pp. 3354-3362.
Collins, S. et al. (2017) "Activation of Cp2ZrX2 (X=Me, Cl) by Methylaluminoxane as Studied by Electrospray Ionization Mass Spectrometry: Relationship to Polymerization Catalysis," Macromolecules, v.50(22), pp. 8871-8884.

* cited by examiner

*Primary Examiner* — Fred M Teskin
(74) *Attorney, Agent, or Firm* — C. Tumey Law Group PLLC

(57)      ABSTRACT

A method including: contacting a support material including absorbed water with trimethylaluminum (TMA) in an aliphatic hydrocarbon; removing the aliphatic hydrocarbon by distillation at a pressure greater than or equal to 0.5 atm; heating, at a temperature ranging from about 25° C. to about 200° C., a reaction product of the support material and the TMA in a presence of TMA, wherein the TMA includes TMA in an amount of about 2-10 mmol TMA per gram of the support material in excess of an amount that reacts with the support material absorbed with water; and removing excess TMA.

13 Claims, 1 Drawing Sheet

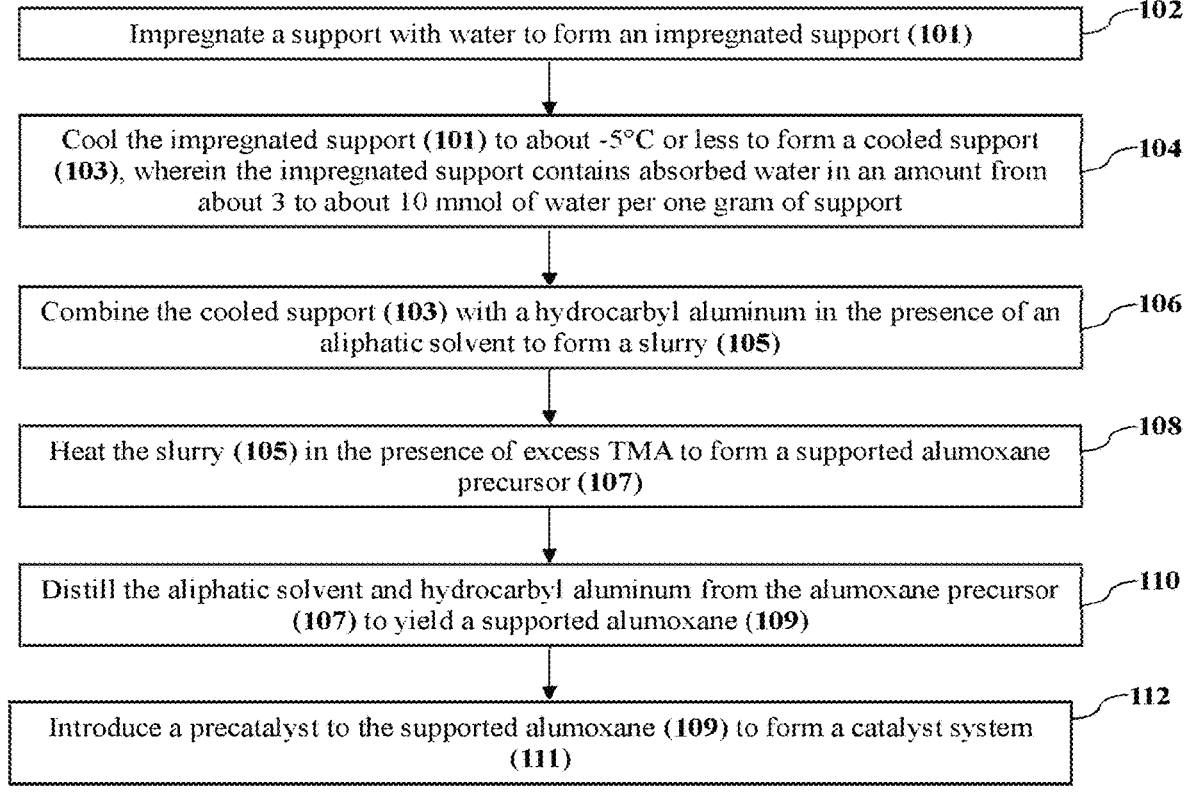

Impregnate a support with water to form an impregnated support (101) ⟶ 102

Cool the impregnated support (101) to about -5°C or less to form a cooled support (103), wherein the impregnated support contains absorbed water in an amount from about 3 to about 10 mmol of water per one gram of support ⟶ 104

Combine the cooled support (103) with a hydrocarbyl aluminum in the presence of an aliphatic solvent to form a slurry (105) ⟶ 106

Heat the slurry (105) in the presence of excess TMA to form a supported alumoxane precursor (107) ⟶ 108

Distill the aliphatic solvent and hydrocarbyl aluminum from the alumoxane precursor (107) to yield a supported alumoxane (109) ⟶ 110

Introduce a precatalyst to the supported alumoxane (109) to form a catalyst system (111) ⟶ 112

1

TOLUENE FREE PREPARATION OF SMAO: HEATING WITH TMA TO IMPROVE ACTIVITY

CROSS-REFERENCE OF RELATED APPLICATIONS

This application is a National Phase Application claiming priority to PCT Application Serial No. PCT/US2021/059626, filed Nov. 17, 2021, which claims the benefit of and priority to U.S. Provisional Application No. 63/117,295 filed Nov. 23, 2020, entitled "Toluene Free Preparation of SMAO: Heating with TMA to Improve Activity", the disclosures of which are incorporated herein by reference in their entireties.

FIELD

The present disclosure relates to a method of forming a supported methylaluminoxane, and more particularly to a toluene free preparation of supported methylaluminoxane.

BACKGROUND

Polyolefins are widely used commercially because of their robust physical properties. For example, various types of polyethylenes, including high density, low density, and linear low density polyethylenes, are some of the most commercially useful. Polyolefins are typically prepared with a catalyst (mixed with one or more other components to form a catalyst system) which promotes polymerization of olefin monomers in a reactor, such as a gas phase reactor.

Methyaluminoxane (MAO), sometimes referred to as polymethylaluminoxane (PMAO), has broad utility as an activator for metallocene and non-metallocenes in olefin polymerization catalysis. It is particularly useful in the preparation of catalysts supported on porous metal oxide supports for use in synthesis of polyethylene or polypropylene and their copolymers in gas-phase or slurry processes (Hlatky, G. (2000) "Heterogeneous Single-Site Catalysts for Olefin Polymerization," Chem. Rev., v. 100, pp. 1347-1376; Fink, G. et. al. (2000) "Propene Polymerization with Silica-Supported Metallocene/MAO Catalysts," Chem. Rev., v. 100(4), pp. 1377-1390; Severn, J. R. et. al. (2005) ""Bound but Not Gagged"—Immobilizing Single-Site α-Olefin Polymerization Catalysts," Chem. Rev., v. 105, pp. 4073-4147). However, MAO is challenging to prepare. MAO is typically formed from the low temperature reaction of trimethylaluminum (TMA) and water in toluene. This reaction is very exothermic and requires special care to control. This solution must be stored cold as it forms an insoluble gel over time at ambient temperature. (Zjilstra, H. S. et. al. (2015) "Methylalumoxane—History, Production, Properties, and Applications," Eur. J Inorg. Chem., v. 2015(1), 19-43). For these reasons, there are only a limited number of commercial manufacturers with the specialized skills and equipment to prepare MAO.

Methylalumoxane, or MAO, is the most popular activator supported on silica to activate a single site catalyst precursor, e.g., a metallocene, to form an active solid catalyst used in a commercial gas phase reactor to produce single-site polyolefin resins. Commercial MAO is commonly sold as a toluene solution because an aromatic solvent can dissolve MAO without causing any issue observed with other solvents, e.g., a donor containing solvent (e.g., an ether or a THF) deactivates MAO, an active proton containing solvent (e.g., an alcohol) reacts and destroys MAO, and an aliphatic solvent (e.g., hexane) precipitates MAO. However, the MAO toluene solution is stored in a cold environment, e.g., at −20 to −30° C., to reduce the gelation process typically observed for this kinetic product. A homogeneous MAO solution is desired for MAO molecules to be evenly distributed in the pores of the catalyst support material, e.g., silica, to obtain a catalyst with good performance including good productivity and good operability. However, polyolefin products are often used as plastic packaging for sensitive products, and the amount of non-polyolefin compounds, such as toluene, present in the polyolefin products should be minimized.

MAO is typically formed from the low temperature reaction of trimethylaluminum (TMA) and water in toluene. This reaction is very exothermic and requires special care to control. MAO is recognized to be a distribution of cage structures with a composition near $Al_1O_{0.75}Me_{1.5}$ when it is freshly prepared. This solution must be stored cold as it forms an insoluble gel over time at ambient temperature. In spite of its wide spread use, the chemical structure of MAO is still uncertain (Zjilstra, H. S. et. al. (2015) Eur. J Inorg. Chem., 19-43; Imhoff, D. W. et. al. (1998) "Characterization of Methylaluminoxanes and Determination of Trimethylaluminum Using Proton NMR," Organometallics, v. 17(10), pp. 1941-1945; Ghiotto, F. et. al. (2013) "Probing the Structure of Methylalumoxane (MAO) by a Combined Chemical, Spectroscopic, Neutron Scattering, and Computational Approach," Organometallics, v. 32(11), pp. 3354-3362; Collins, S. et al. (2017) "Activation of Cp2ZrX2 (X=Me, Cl) by Methylaluminoxane As Studied by Electrospray Ionization Mass Spectrometry: Relationship to Polymerization Catalysis," Macromolecules, v. 50(22), pp. 8871-8884).

US Patent Application Publication 2019/0127497, the entirety of which is incorporated herein by reference, describes the preparation of supported MAO (SMAO) and supported catalysts from addition of slurries of amorphous silica, water, hexane and oil to cold TMA solutions followed by filtration, drying then reslurrying in a high boiling solvent (Isopar E) followed by heating to 100° C., filtration, washing and drying. This method yields high activity catalysts, but it is complicated by the different filtration and reslurrying steps. It also uses high amounts of water (14 wt %, 9 mmol water/g silica), which increases the amount of TMA needed in the catalyst preparation. TMA is expensive and pyrophoric, so it is desirable to minimize its usage.

Moreover, although toluene-free processes for producing SMAO exist, these processes often require high amounts of water which increases the amount of TMA required in the catalyst preparation.

SUMMARY

A method including: contacting a support material including absorbed water with trimethylaluminum (TMA) in an aliphatic hydrocarbon; removing the aliphatic hydrocarbon by distillation at a pressure greater than or equal to 0.5 atm; heating, at a temperature ranging from about 25° C. to about 200° C., a reaction product of the support material and the TMA in a presence of TMA, wherein the TMA includes TMA in an amount of about 2-10 mmol TMA per gram of the support material in excess of an amount that reacts with the support material absorbed with water; and removing excess TMA.

In the method, the heating can be at a temperature range from about 70° C. to about 100° C.

The method can further include producing a supported methylaluminoxane without detectable toluene.

The method can further include impregnating the support material with about 2-10 mmol water per gram of the support material.

The method can further include impregnating the support material with about 2-6 mmol water per gram of the support material.

In the method, the aliphatic hydrocarbon can be pentane.

In the method, prior to the heating step, bringing a temperature of the reaction product of the support material and the TMA to about 23° C.

In the method, an amount of TMA on the support can be from 1.0 mmol TMA per gram of support to 12 mmol TMA per gram of support.

The method can further include: generating a supported methylaluminoxane; and generating a catalyst system by introducing a catalyst compound to the supported methylaluminoxane.

In the method, the catalyst compound can be a metallocene.

In the method, the catalyst compound is not a metallocene.

The method can further include generating a polymer from the catalyst system.

In the method, the removing the aliphatic hydrocarbon can be performed before the heating of the reaction product.

In the method, the heating of the reaction product can be performed before the removing the aliphatic hydrocarbon.

In the method, the aliphatic hydrocarbon has a boiling point less than or equal to 120° C.

In the method, the contacting can performed at a temperature less than or equal to −5° C. with the support material being a silica, dehydrated at greater than or equal to 600° C., that includes 2-6 mmol absorbed water per gram silica, and wherein the heating can be performed at a temperature ranging from about 70° C. to 90° C., with an excess amount of the TMA of about 7 mmol per gram silica.

BRIEF DESCRIPTION OF THE DRAWINGS

The FIGURE as the drawing is a flow chart of an exemplary method of the present technological advancement for preparing SMAO.

DETAILED DESCRIPTION

Methylaluminoxane (MAO) is a key component to many gas-phase polyethylene (GPPE) catalysts. The preparation of MAO is challenging and there are a limited number of MAO suppliers. It would be desirable to make MAO and MAO based supported catalysts on demand in simple equipment. This would eliminate the need for cold storage of MAO, which is known to be thermally unstable. It would also be desirable to avoid aromatics solvents in the manufacture of supported catalysts to minimize the amount of aromatic residue in the resulting polymer. To meet these needs, exemplary embodiments of a convenient process to prepare supported MAO in-situ from TMA and silica-water in alkane solvent are described herein. The exemplary embodiments herein can provide a simple preparation of a supported catalyst that utilizes an in-situ preparation of MAO within a metal oxide support that avoids the complications from a low temperature process, MAO storage instability, and limited MAO suppliers.

By way of explanation for a non-limiting example, preparation of MAO can involve first adding cold support material, containing water, to a solution of excess trimethylaluminum then heating the initial low activity SMAO in the presence of TMA to obtain a support-activator capable of providing high activity olefin polymerization catalysts. This procedure differs from the method described in US Patent Application Publication 2019/0127497, and the present non-limiting embodiment heats the initial SMAO in the presence of extra TMA to raise activity of subsequent catalysts, and also gives high activity at low water levels. Lower water levels will reduce the amount of expensive and pyrophoric TMA necessary in the preparation. This exemplary embodiment in the present application also employs silica-water as a solid instead of a suspension with oil and solvent, which allows for high slurry concentrations to be achieved in the reactor without the presence of oil and without the need for filtration during a catalyst preparation.

Exemplary embodiments of the present technological advancement can advantageously heat the initial reaction product between silica-water and TMA in the presence of TMA. This approach gives high activity at relatively low water levels and gives higher activity than filtration and heating alone. Exemplary embodiments can also employ silica-water as a solid instead of a suspension with oil and solvent, which allows for high slurry concentrations to be achieved in the reactor without the presence of oil and without the need for filtration during a catalyst preparation.

Support-water may be prepared by addition of water to a suitable silica or other support containing surface hydroxyl species. For example, combinations of silica and water can be combined in a closed system and heated to redistribute the water amongst the silica particles. Typically, the mixture may be heated to 55° C. to effect the redistribution. The silica is typically dehydrated between 200 and 900° C. The amount of water loaded onto the silica is typically between 3 and 5 mmol water/g silica although it may be higher. High activity catalysts can be obtained with water loadings near 6 wt %, which is less than % of the water used in earlier preparations. This will lower the level of TMA needed in the catalyst procedures.

In one embodiment of the present technological advancement, cold silica-water is added portion-wise to a stirred solution of TMA and alkane solvent. After addition is complete, the mixture is warmed to room temperature (about 23° C., wherein this is room temperature (RT) in this disclosure unless otherwise noted). The improved SMAO is obtained by heating the initial SMAO in the presence of TMA. This may occur by removing the solvent and heating the initial SMAO in the presence of excess TMA then drying. Alternatively, the slurry with excess TMA may be heated then dried. If precatalyst is added to the heated slurry procedure, a one-pot procedure for a supported catalyst is obtained. If the initial SMAO is filtered and then heated in analogy to the earlier report in US Patent Application Publication 2019/0127497, then poorer activating SMAO results.

Use of a toluene free solvent provides a catalyst system (and polyolefin products) with no detectable amount of aromatic hydrocarbon solvent content while maintaining activity similar to that of catalyst systems prepared with pre-formed alumoxanes and or using toluene. Maintaining activity would not be expected since catalyst system components such as alumoxane, precipitate in the presence of an aliphatic solvent. A homogeneous alumoxane solution is desired for alumoxane molecules to be evenly distributed in the pores of the catalyst support material, e.g., silica, to obtain a catalyst with good performance including good productivity and good operability. It has been discovered that neither drying nor the addition of an aliphatic solvent to catalyst systems of the present disclosure significantly reduces the activity of the catalyst system for polymerization.

Reducing or eliminating aromatic solvents in the catalyst system provides polyolefin products having little to no detectable aromatic hydrocarbon solvent, such as no detectable toluene, as determined by gas phase chromatography. The polyolefin products may be used as plastic materials for use in toluene-free materials such as in packaging for food products. Furthermore, many aliphatic solvents have lower boiling points than aromatic solvents, such as toluene (110° C.), which makes the aliphatic solvent easier to remove from the SMAO, catalyst, and/or polyolefin products.

The FIGURE as the drawing is a flow chart of an exemplary method of the present technological advancement for preparing SMAO. An embodiment of the present disclosure includes a method for forming a catalyst system including step impregnating (102) a support with from about 2 wt % to about 20 wt % water to form an impregnated support (101) and cooling (104) the impregnated support (101) to about −5° C. or less to form a cooled support (103). The method further includes combining (106) the cooled impregnated support (103) with a hydrocarbyl aluminum (e.g., TMA) in the presence of an aliphatic solvent (e.g., pentane) to form a slurry (105) and heating (108) the slurry (105) in the presence of excess TMA to form a supported alumoxane precursor (107).

The method can include distilling (110) the aliphatic solvent and the hydrocarbyl aluminum from the alumoxane precursor (107) to yield a supported alumoxane (109), which can be removed together or individually, and introducing (112) a precatalyst to the supported alumoxane (109) to form a catalyst system (111). In some embodiments, the precatalyst can be combined with an alkane solvent, such as hexane, to form a precatalyst solution and the precatalyst solution can be introduced to the supported alumoxane (109). The supported alumoxane (109) can be combined with an alkane solvent, such as hexane prior to combining the supported alumoxane (109) with the precatalyst solution. In some embodiments, the alkane solvent combined with the supported alumoxane is the same as the alkane solvent in the precatalyst solution.

In the embodiment described relative to the FIGURE, removing the aliphatic hydrocarbon can be performed before the heating of the reaction product. In the embodiment described relative to the FIGURE, the heating of the reaction product can be performed before the removing the aliphatic hydrocarbon.

As illustrated in the FIGURE, the method can include heating (108) the slurry (105) in the presence of excess TMA to about 70° C. to about 100° C. for about 1 hour to about 4 hours to form the supported alumoxane precursor (107). However, heating (108) can range from 25° C. to 200° C., and more preferably from 60° C. to 100° C., and most preferably around 85° C. The method can further include combining the alumoxane precursor (107) with a precatalyst to form a catalyst system (111). For example, the precatalyst can be combined with an alkane solvent, such as hexane, to form a precatalyst solution and the precatalyst solution can be introduced to the supported alumoxane precursor (107) to produce the catalyst system (111). The alkane solvent in the catalyst system (111) can be distilled under vacuum at from 60° C. to 80° C. to form an example catalyst system of the present disclosure. In at least one embodiment, the supported alumoxane precursor is contacted with the precatalyst or precatalyst solution for a period of time from about 0.02 hours to about 24 hours, such as from about 0.1 hours to about 1 hour, 0.2 hours to 0.6 hours, 2 hours to about 16 hours, or from about 4 hours to about 8 hours.

In certain aspects of the present disclosure, the solvent can be charged into a reactor, followed by a supported alumoxane. Catalyst or precatalyst can then be charged into the reactor, such as a solution of catalyst or precatalyst in an aliphatic solvent, such as an alkane solvent or as a solid. The mixture can be stirred at a temperature, such as about room temperature. Additional solvent may be added to the mixture to form a slurry having a desired consistency, such as from about 2 cc/g of silica to about 20 cc/g silica, such as about 4 cc/g. The solvent is then removed. Removing solvent dries the mixture and may be performed under a vacuum atmosphere, purged with inert atmosphere, heating of the mixture, or combinations thereof. For heating of the mixture, any suitable temperature can be used that evaporates the aliphatic solvent. It is to be understood that reduced pressure under vacuum will lower the boiling point of the aliphatic solvent depending on the pressure of the reactor. Solvent removal temperatures can be from about 10 degrees Celsius to about 200 degrees Celsius, such as from about 60 degrees Celsius to about 140 degrees Celsius, such as from about 60 degrees Celsius to about 120 degrees Celsius, for example about 80 degrees Celsius or less, such as about 70 degrees Celsius or less. In at least one embodiment, removing solvent includes applying heat, applying vacuum, and/or applying nitrogen purged from the bottom of the vessel by bubbling nitrogen through the mixture. The mixture is dried.

Moreover, variations of the above methods can be implemented as provided in the following chart and other variations as will be appreciated by those of ordinary skill in the art.

| Step | Sequence 1 | Sequence 2 |
|---|---|---|
| 1 | Impregnate a support with water to form an impregnated support wherein water is absorbed in an amount from about 3 to about 10 mmol of water per gram of support | Impregnate a support with water to form an impregnated support wherein water is absorbed in an amount from about 3 to about 10 mmol of water per gram of support |
| 2 | Cool the impregnated support to about −5° C. or less | Cool the impregnated support to about −5° C. or less |
| 3 | Add the cooled, water impregnated support to a cooled (<−5° C.) hydrocarbyl aluminum mixture that is greater than or equat to 85 mol % TMA in the presence of an aliphatic solvent to form a slurry | Add the cooled, water impregnated support to a cooled (<−5° C.) hydrocarbyl aluminum mixture that is greater than or equal to 85 mol % TMA in the presence of an aliphatic solvent to form a slurry |

-continued

| Step | Sequence 1 | Sequence 2 |
|------|------------|------------|
| 4 | Remove the solvent by atmospheric distillation | Heat the slurry at a temperature greater than or equal to 25° C. |
| 5 | Heat the nascent SMAO in the presence of excess hydrocarbyl aluminum between 70 and 200° C. | Introduce a precatalyst to the supported alumoxane to form a supported catalyst at temperatures less than or equal to 200° C. |
| 6 | Remove the excess hydrocarbyl aluminum | Remove solvent and excess hydrocarbyl aluminum mixture to obtain a supported catalyst |
| 7 | Introduce a precatalyst to the supported alumoxane to form a supported catalyst | — |

The term "about" when used as a modifier for, or in conjunction with, a variable, characteristic or condition is intended to convey that the numbers, ranges, characteristics and conditions disclosed herein are flexible and that practice of the present technological advancement by those skilled in the art using temperatures, rates, times, concentrations, carbon numbers, amounts, contents, properties such as size, density, surface area, etc., that are outside of the stated range or different from a single stated value, will achieve the desired result or results as described in the application, namely, an activated support or catalyst system without detectable toluene. All numerical values within the detailed description herein are modified by "about" or "approximately" the indicated value, and take into account experimental error and variations that would be expected by a person having ordinary skill in the art (unless otherwise noted).

For purposes of the present disclosure, "detectable aromatic solvent" means >20,000 ppm aromatics as determined by gas phase chromatography. For purposes of the present disclosure, "detectable toluene" means >20,000 ppm or more as determined by gas phase chromatography.

For purposes of the present disclosure, the numbering scheme for the Periodic Table Groups is used as described in Chemical and Engineering News, v. 63(5), pg. 27 (1985). Therefore, a "Group 4 metal" is an element from group 4 of the Periodic Table, e.g., Hf, Ti, or Zr.

"Catalyst productivity" is a measure of how many grams of polymer (P) are produced using a polymerization catalyst comprising W g of catalyst (cat), over a period of time of T hours; and may be expressed by the following formula: P/(T×W) and expressed in units of $gPgcat^{-1}\ hr^{-1}$. Conversion is the amount of monomer that is converted to polymer product, and is reported as mol % and is calculated based on the polymer yield (weight) and the amount of monomer fed into the reactor. Catalyst activity is a measure of the level of activity of the catalyst and is reported as the mass of product polymer (P) produced per mol of transition metal complex hour (gP/mol transition metal complex×hour). In an at least one embodiment, the productivity of the catalyst is at least 800 gpolymer/gsupported catalyst/hour, such as about 1,000 or more gpolymer/gsupported catalyst/hour, such as about 2,000 or more gpolymer/gsupported catalyst/hour, such as about 3,000 or more gpolymer/gsupported catalyst/hour, such as about 4,000 or more gpolymer/gsupported catalyst/hour, such as about 5,000 or more gpolymer/gsupported catalyst/hour.

A "catalyst system" is a combination of at least one catalyst compound and a support material. The catalyst system may have at least one activator and/or at least one co-activator. When catalyst systems are described as comprising neutral stable forms of the components, it is well understood that the ionic form of the component is the form that reacts with the monomers to produce polymers. For purposes of the present disclosure, "catalyst system" includes both neutral and ionic forms of the components of a catalyst system.

In the present disclosure, the catalyst may be described as a catalyst precursor, a pre-catalyst compound, catalyst compound or a transition metal compound, and these terms are used interchangeably.

Support Materials

In at least one embodiment, a catalyst system includes an inert support material capable of absorbing water in an amount of at least 0.5 mmol of water per gram of support material. The support material may be a porous support material, for example, talc, and inorganic oxides. Other support materials include zeolites, clays, organoclays, or any other organic or inorganic support material and the like, or mixtures thereof.

In at least one embodiment, the support material is an inorganic oxide in a finely divided form. Suitable inorganic oxide materials for use in catalyst systems herein include Groups 2, 4, 13, and 14 metal oxides, such as silica, alumina, and mixtures thereof. Other inorganic oxides that may be employed, either alone or in combination, with the silica, or alumina are magnesia, titania, zirconia, and the like. Other suitable support materials, however, can be employed, for example, finely divided functionalized polyolefins, such as finely divided polyethylene, polypropylene, and polystyrene with functional groups that are able to absorb water, e.g., oxygen or nitrogen containing groups such as —OH, —RC=O, —OR, and —NR₂. Particularly useful supports include magnesia, titania, zirconia, montmorillonite, phyllosilicate, zeolites, talc, clays, silica clay, silicon oxide clay, and the like. Also, combinations of these support materials may be used, for example, silica-chromium, silica-alumina, silica-titania, and the like. In at least one embodiment, the support material is selected from $Al_2O_3$, $ZrO_2$, $SiO_2$, $SiO_2/Al_2O_2$, silica clay, silicon oxide/clay, or mixtures thereof. The support material may be fluoride.

As used herein, the phrases "fluorided support" and "fluorided support composition" mean a support, desirably particulate and porous, which has been treated with at least one inorganic fluorine containing compound. For example, the fluorided support composition can be a silicon dioxide support wherein a portion of the silica hydroxyl groups has been replaced with fluorine or fluorine containing compounds. Suitable fluorine containing compounds include, but are not limited to, inorganic fluorine containing compounds and/or organic fluorine containing compounds.

Fluorine compounds suitable for providing fluorine for the support may be organic or inorganic fluorine compounds and are desirably inorganic fluorine containing compounds. Such inorganic fluorine containing compounds may be any compound containing a fluorine atom as long as it does not contain a carbon atom. Particularly desirable are inorganic fluorine-containing compounds selected from $NH_4BF_4$, $(NH_4)_2SiF_6$, $NH_4PF_6$, $NH_4F$, $(NH_4)_2TaF_7$, $NH_4NbF_4$, $(NH_4)_2$ $GeF_6$, $(NH_4)_2SmF_6$, $(NH_4)_2TiF_6$, $(NH_4)_2ZrF_6$, $MoF_6$, $ReF_6$, $GaF_3$, $SO_2ClF$, $F_2$, $SiF_4$, $SF_6$, $ClF_3$, $ClF_5$, $BrF_5$, $IF_7$, $NF_3$, $HF$, $BF_3$, $NHF_2$, $NH_4HF_2$, and combinations thereof. In at least one embodiment, ammonium hexafluorosilicate and ammonium tetrafluoroborate are used.

In at least one embodiment, the support material comprises a support material treated with an electron-withdrawing anion. The support material can be silica, alumina, silica-alumina, silica-zirconia, alumina-zirconia, aluminum phosphate, heteropolytungstates, titania, magnesia, boria, zinc oxide, mixed oxides thereof, or mixtures thereof; and the electron-withdrawing anion is selected from fluoride, chloride, bromide, phosphate, triflate, bisulfate, sulfate, or any combination thereof.

An electron-withdrawing component can be used to treat the support material. The electron-withdrawing component can be any component that increases the Lewis or Brønsted acidity of the support material upon treatment (as compared to the support material that is not treated with at least one electron-withdrawing anion). In at least one embodiment, the electron-withdrawing component is an electron-withdrawing anion derived from a salt, an acid, or other compound, such as a volatile organic compound, that serves as a source or precursor for that anion. Electron-withdrawing anions can be sulfate, bisulfate, fluoride, chloride, bromide, iodide, fluorosulfate, fluoroborate, phosphate, fluorophosphate, trifluoroacetate, triflate, fluorozirconate, fluorotitanate, phospho-tungstate, or mixtures thereof, or combinations thereof. An electron-withdrawing anion can be fluoride, chloride, bromide, phosphate, triflate, bisulfate, or sulfate, and the like, or any combination thereof, at least one embodiment of this disclosure. In at least one embodiment, the electron-withdrawing anion is sulfate, bisulfate, fluoride, chloride, bromide, iodide, fluorosulfate, fluoroborate, phosphate, fluorophosphate, trifluoroacetate, triflate, fluorozirconate, fluorotitanate, or combinations thereof.

Thus, for example, the support material suitable for use in the catalyst systems of the present disclosure can be one or more of fluorided alumina, chlorided alumina, bromided alumina, sulfated alumina, fluorided silica-alumina, chlorided silica-alumina, bromided silica-alumina, sulfated silica-alumina, fluorided silica-zirconia, chlorided silica-zirconia, bromided silica-zirconia, sulfated silica-zirconia, fluorided silica-titania, fluorided silica-coated alumina, sulfated silica-coated alumina, phosphated silica-coated alumina, and the like, or combinations thereof. In at least one embodiment, the activator-support can be, or can comprise, fluorided alumina, sulfated alumina, fluorided silica-alumina, sulfated silica-alumina, fluorided silica-coated alumina, sulfated silica-coated alumina, phosphated silica-coated alumina, or combinations thereof. In another embodiment, the support material includes alumina treated with hexafluorotitanic acid, silica-coated alumina treated with hexafluorotitanic acid, silica-alumina treated with hexafluorozirconic acid, silica-alumina treated with trifluoroacetic acid, fluorided boria-alumina, silica treated with tetrafluoroboric acid, alumina treated with tetrafluoroboric acid, alumina treated with hexafluorophosphoric acid, or combinations thereof. Further, any of these activator-supports optionally can be treated with a metal ion.

Nonlimiting examples of cations suitable for use in the present disclosure in the salt of the electron-withdrawing anion include ammonium, trialkyl ammonium, tetraalkyl ammonium, tetraalkyl phosphonium, H+, $[H(OEt_2)_2]+$, $[HNR_3]+(R=C_1-C_{20}$ hydrocarbyl group, which may be the same or different) or combinations thereof.

Further, combinations of one or more different electron-withdrawing anions, in varying proportions, can be used to tailor the specific acidity of the support material to a desired level. Combinations of electron-withdrawing components can be contacted with the support material simultaneously or individually, and in any order that provides a desired chemically-treated support material acidity. For example, in at least one embodiment, two or more electron-withdrawing anion source compounds in two or more separate contacting steps.

An example of a process by which a chemically-treated support material is prepared is as follows: a selected support material, or combination of support materials, can be contacted with a first electron-withdrawing anion source compound to form a first mixture; such first mixture can be calcined and then contacted with a second electron-withdrawing anion source compound to form a second mixture; the second mixture can then be calcined to form a treated support material. In such a process, the first and second electron-withdrawing anion source compounds can be either the same or different compounds.

The method by which the oxide is contacted with the electron-withdrawing component, typically a salt or an acid of an electron-withdrawing anion, can include, but is not limited to, gelling, co-gelling, impregnation of one compound onto another, and the like, or combinations thereof. Following a contacting method, the contacted mixture of the support material, electron-withdrawing anion, and optional metal ion, can be calcined.

According to another embodiment of the present disclosure, the support material can be treated by a process comprising: (i) contacting a support material with a first electron-withdrawing anion source compound to form a first mixture; (ii) calcining the first mixture to produce a calcined first mixture; (iii) contacting the calcined first mixture with a second electron-withdrawing anion source compound to form a second mixture; and (iv) calcining the second mixture to form the treated support material.

It is preferred that the support material, most preferably an inorganic oxide, has a surface area between about 10 $m^2/g$ and about 800 $m^2/g$ (optionally 700 $m^2/g$), pore volume between about 0.1 cc/g and about 4.0 cc/g and average particle size between about 5 μm and about 500 m. In at least one embodiment, the surface area of the support material is between about 50 $m^2/g$ and about 500 $m^2/g$, pore volume between about 0.5 cc/g and about 3.5 cc/g and average particle size between about 10 μm and about 200 μm. The surface area of the support material may be between about 100 $m^2/g$ and about 400 $m^2/g$, pore volume between about 0.8 cc/g and about 3.0 cc/g and average particle size between about 5 μm and about 100 μm. The average pore size of the support material may be between about 10 Å and about 1000 Å, such as between about 50 Å and about 500 Å, such as between about 75 Å and about 350 Å. In at least one embodiment, the support material is an amorphous silica with surface area of 300 to 400 $m^2/gm$ and a pore volume of 0.9 to 1.8 $cm^3/gm$. In at least one embodiment, the supported material may optionally be a sub-particle containing silica with average sub-particle size of 0.05 to 5 micron, e.g., from the spray drying of average particle size of 0.05 to 5 micron small particle to form average particle size of 5 to 200 micron large main particles. In at least one embodiment of the supported material, at least 20% of the total pore volume (as defined by BET method) has a pore diameter of 100 angstrom or more. Non-limiting example silicas include Grace Davison's 952, 955, and 948; PQ Corporation's ES70 series, PD 14024, PD16042, and PD16043; Asahi Glass Chemical (AGC)'s D70-120A, DM-H302, DM-M302, DM-M402, DM-L302, and DM-L402; Fuji's P-10/20 or P-10/40; and the like.

Supported Materials Having Absorbed Water

In embodiments of the present disclosure, the support material will contain from 2.0 mmol absorbed water per gram of support material to 10 mmol absorbed water per gram of support material as determined by TGA (more preferably 2-8 mmol absorbed water per gram of support material, more preferably 2-6 mmol absorbed water per gram of support material, even more preferably about 3-5 mmol absorbed water per gram of support material, and, even more preferably about 4 mmol absorbed water per gram of support material). The water level limits the reagent in the MAO synthesis. The amount of absorbed water is determined by adding a known amount of water into the support hydrocarbon slurry in a close container and agitate to allow the water to distribute in the pore of the support and/or by a standard thermogravimetric analysis method, e.g., LOD (loss on drying) at the temperature 200° C. for 4 hours. Most commercial support materials will contain some absorbed water and in some cases the amount of absorbed water may be sufficient. In other cases additional water can be added or the support material can be dried and then the support material can be contacted with an amount of water. This can be accomplished, for example, by slurrying the silica in an aliphatic solvent, for example hexane, containing an amount of water sufficient to provide water absorbance onto the silica.

Preferably, the support material is silica, alumina, alumina-silica or a derivative thereof.

Preferably, the support material has an average particle size between 1 and 200 microns, an average pore volume of between 0.05 and 5 mL/g, and a surface area between 50 and 800 m²/g.

Optionally, the support material has been treated with one or more of a Bronsted acid, a Lewis acid, a salt and a Lewis base.

Optionally, the support material comprises a silylating agent.

Optionally, the support material comprises a hydrocarbyl aluminum compound.

Optionally, one or more of the support material comprises an electron withdrawing anion.

Aliphatic Solvents

Suitable aliphatic solvents are materials in which all of the reactants used herein, e.g., the support and the hydrocarbyl aluminum, are at least partially soluble and which are liquid at reaction temperatures. Non-limiting example solvents are non-cyclic alkanes with formula $C_nH_{(n+2)}$ where n=4-30, such as isopentane, hexane, heptane, octane, nonane, decane and the like, and cycloalkanes with formula $C_nH_n$ where n=5-30, such as cyclopentane, methylcyclopentane, methylcyclohexane and the like.

Suitable aliphatic solvents are materials in which the transition metal complex and the hydrocarbyl aluminum, are at least partially soluble and which are liquid at reaction temperatures. Non-limiting example solvents, suitable for sequence 1, are pentane or an aliphatic hydrocarbon with a boiling point less than or equal to 70° C. Advantageously, pentane has a much lower boiling point than the TMA so it can be removed by atmospheric distillation with minimal co-distillation of the TMA, which leaves more TMA on the support. Removing solvent dries the mixture and may be performed under a vacuum atmosphere, purged with inert atmosphere, heating of the mixture, or combinations thereof. Preferably, the distillation can be performed at a pressure that is greater than or equal to 0.5 atm.

Hydrocarbyl Aluminum Compounds

The preferred hydrocarbyl aluminum compound is trimethylaluminum (TMA). An amount of TMA on the support can be from 1.0 mmol TMA per gram of support to 12 mmol TMA per gram of support. More preferably, an amount of TMA on the support can be from 4 mmol TMA per gram support to 8 mmol TMA per gram support. Most preferably, an amount of TMA per gram of support is about 7 mmol TMA per gram of support.

Supported MAO

The SMAO of the present disclosure is prepared in-situ by contacting the water saturated silica in an aliphatic solvent with the hydrocarbyl aluminum compound in an aliphatic solvent. The silica slurry is added slowly to the hydrocarbyl aluminum solution, at a temperature of from less than 0° C. to −60° C., preferably at a temperature of from −10° C. to −50° C., such as from −20° C. up to −40° C., or less than −10° C., −20° C. or −30° C., so that the internal temperature of the reactor is maintained in a desired range, e.g., within 1° C., −15° C., or −25° C. After the addition is complete, the mixture is allowed to warm to room temperature (which may or may not include the use of an additional heat source). An improved SMAO is obtained by heating the room temperature initial SMAO in the presence of TMA in an amount of 2-10 mmol TMA per gram of support material, and more preferably 6.2-8.2 mmol TMA per gram of support material. The solvent may be removed prior to heating. The heating of the initial SMAO can be done in a range of 70-100° C., preferably, 80-90° C., and more preferably 85-90° C. After the heating, the SMAO may be dried. Alternatively, the slurry with excess TMA may be heated and then dried. If a precatalyst is added to the heated slurry procedure, a one-pot procedure for a supported catalyst is obtained. If the initial SMAO is filtered and then heated in analogy to the earlier report in US Patent Application Publication 2019/0127497 (i.e., not heating in the presence of TMA), then poorer activating SMAO results.

A catalyst system embodying the present technological advancement can be used to produce polymers with any of the catalysts compounds, methods and systems disclosed in US Patent Application Publication 2019/0127497; particularly the metallocene catalyst compounds, non-metallocene catalysts, polymerization processes, gas phase polymerization, and slurry phase polymerization. Such polymers produced by the catalyst system embodying the present technological advancement are suitable for all conventional uses of such polymers, including but not polyolefin products; many of which are described US Patent Application Publication 2019/0127497.

EXAMPLES

Unless specified otherwise, all procedures were carried out under $N_2$ atmosphere and all reagents were obtained from Aldrich Chemical Company. Anhydrous alkanes were sparged with $N_2$ then stored over dry 3 Å molecular sieves. ES70 Silica were obtained from PQ Corporation and dehydrated in a tube furnace under a stream of flowing $N_2$; the temperature of dehydration in degrees Celsius is indicated in brackets within the text. (1,3-Me, BuCp)$_2$ZrCl$_2$ (PreCat 1) was obtained from Grace Chemical and purified by crystallization from hexanes. Rac-Me$_2$Si(tetrahydroindenyl)$_2$ZrCl$_2$ was obtained from Grace Chemical and methylated with Grignard reagent to obtain rac-Me$_2$Si(tetrahydroindenyl)$_2$ ZrMe$_2$ (PreCat 2). (PrCp)$_2$HfMe$_2$ (PreCat 3) was obtained from Boulder Scientific. Rac-Ethylenebis(indenyl)ZrCl$_2$ (PreCat 4) was obtained from Strem Chemical company and used as received. Levels of TMA in solution were determined by NMR spectroscopy.

Water absorbed on silica was measured by weight loss after a 1° C./min ramp rate from 25 to 200° C. then a 3 hour hold time using a Leco TGA 701.

Example 1. Preparation of Silica-Water

ES70(875) (10 g) was mixed with water (0.774 mL, 43 mmol) in an 8 oz. bottle, shook well and poured into a new 8 oz. bottle. Repeated until total of 50 g silica have been added to the second bottle. The bottle was secured tightly with a Teflon lined cap. The entire bottle was heated until the glass reached an internal wall temperature of 55° C. then held for 5 hours. The bottle was allowed to cool to room temperature overnight. There was no water condensed on surface of walls. TGA indicated a final water content of 6 wt % (3.55 mmol water/g initial silica) based on weight loss upon heating to 200° C.

Example 2. SMAO Preparation 38 g of ES70(200) containing 3.78 mmol water/g silica was divided into 19 portions of 2 g and cooled to −40° C. in a freezer overnight. Individual vials were removed from freezer and added portion-wise into a mechanically stirred, cold (approx. −20° C.) solution of TMA (37.12 g, 514.7 mmol) and pentane (500 mL) in a 1 L 3-neck flask. The temperature rose by roughly 2° C. with each addition and when the temperature rose above −20° C., the slurry was given time to cool before the next addition. After all the solids were added, the slurry was held at −20° C. for 1 hour then warmed to −10° C. for 1 hour then finally allowed to warm to ambient temperature overnight. There was approximately 343 mmol of TMA remaining in solution. The pentane was removed by distillation and the solids, containing TMA. Some heating of the solids in presence of TMA occurred (~55° C.) during pentane removal.

Examples 2a-e

Examples 2a-e were 2 g samples of Ex. 2 with the following treatments. Ex. 2a: none. Ex. 2b: Washed with pentane (3×10 mL) and dried in-vacuo. Ex. 2c: heated 90° C. for 1 hour. Ex. 2d: washed with pentane (3×10 mL), dried in-vacuo then heated at 90° C. for 1 hour. Ex. 2e: heated at 90° C. for 1 hour then washed with pentane (3×10 mL) and dried in-vacuo. These samples were evaluated for 1-octene polymerization ability (Table 1). They indicate SMAO heated in the presence of TMA increases activity.

Example 3. SMAO Preparation 19 g of ES70(200) containing 3.78 mmol water/g silica was divided into 19 portions of 1 g and cooled to −40° C. in a freezer overnight. Individual vials were removed from freezer and added portion-wise into a mechanically stirred, cold (approx. −20° C.) solution of TMA (18.57 g, 257.4 mmol) and pentane (250 mL) in a 1 L 3-neck flask. The temperature rose by roughly 2° C. with each addition and when the temperature rose above −20° C., the slurry was given time to cool before the next addition. After all the solids were added, the slurry was held at −20° C. for 1 hour then warmed to −10° C. for 1 hour then finally allowed to warm to ambient temperature overnight. There was approximately 180 mmol of TMA remaining in solution. The slurry was filtered and the solids washed with pentane (3×50 mL) then dried.

Examples 3a-d

Examples 3a-d were 2 g samples of Ex. 3 heated then evaluated for 1-octene polymerization ability as described in Table 1.

Example 4. Preparation of SMAO 40 g of ES70(875) containing 3.1 mmol water/g silica was divided into 20 portions of 2 g and cooled to −40° C. in a freezer overnight. Individual vials were removed from freezer and added portion-wise into a mechanically stirred, cold (approx. −22° C.) solution of TMA (37.12 g, 515 mmol) and pentane (500 mL) in a 1 L 3-neck flask. The temperature rose by roughly 2° C. with each addition and when the temperature rose above −20° C., the slurry was given time to cool before the next addition. After all the solids were added, the slurry was held at −20° C. for 1 hour then warmed to −10° C. for 1 hour then finally allowed to warm to ambient temperature overnight. There was approximately 348 mmol of TMA remaining in solution. The pentane was removed by distillation and the solids, containing TMA. Some heating of the solids in presence of TMA occurred (~55° C.) during pentane removal.

Examples 4a-d

Aliquots from Ex. 4 were removed and treated as described in Table 1 then evaluated for 1-octene polymerization ability.

Example 5. Preparation of SMAO 50 g of ES70(875) containing 3.55 mmol water/g silica was divided into 25 portions of 2 g and cooled to −40° C. in a freezer overnight. Individual vials were removed from freezer and added portion-wise into a mechanically stirred, cold (approx. −24° C.) solution of TMA (43.3 g, 600 mmol) and pentane (500 mL) in a 1 L 3-neck flask. The temperature rose by roughly 2° C. with each addition and when the temperature rose above −20° C., the slurry was given time to cool before the next addition. After all the solids were added, the slurry was held at −20° C. for 1 hour then warmed to −10° C. for 1 hour then finally allowed to warm to ambient temperature overnight. There was approximately 359 mmol of TMA remaining in solution. The pentane was removed by distillation and the solids, containing the excess TMA, were heated with gentle stirring at an internal wall temperature of 70° C. for 5 hours. Some samples were removed for screening. The remaining TMA was removed by vacuum distillation at 70° C. for 5 hours. Yield was approximately 63 g.

Example 5a. Catalyst Preparation

A solution of PreCat 1 (0.7396 g, 1.708 mmol) and hexane (50 mL) was added to an over-head stirred slurry of Ex. 5

SMAO (41.98 g) and hexane (350 mL) over the course of 1 hour then stirred for an additional hour, filtered and dried under vacuum to obtain 39.2 g catalyst.

Example 5b. Catalyst Preparation

A solution of PreCat 2 (0.0342 g, 0.081 mmol) and hexane (5 mL) was added to an over-head stirred slurry of Ex. 5 SMAO (2.0193 g) and hexane (40 mL) over the course of 15 minutes then stirred for an additional hour, filtered and dried under vacuum to obtain 1.92 g catalyst.

Example 5c. Catalyst Preparation

A solution of PreCat 3 (0.034 g, 0.081 mmol) and hexane (5 mL) was added to an over-head stirred slurry of Ex. 5 SMAO (2.0156 g) and hexane (40 mL) over the course of 15 minutes then stirred for an additional hour, filtered and dried under vacuum to obtain 1.89 g catalyst.

Example 6. Preparation of Catalyst

ES70(875) containing 3.62 mmol water/g silica (50.09 g), prepared similarly to Example 1, was divided into 25 portions of 2 g and cooled to −40° C. in a freezer overnight. Individual vials were removed from freezer and added portion-wise into a mechanically stirred, cold (approx. −24° C.) solution of TMA (25.2 g, 350 mmol) and heptane (500 mL) in a 1 L 3-neck flask. The temperature rose by roughly 2° C. with each addition and when the temperature rose above −20° C., the slurry was given time to cool before the next addition. After all the solids were added, the slurry was removed from the cold bath and placed in a heating mantle then heated to 85° C. for 3 hours. Then a solution of PreCat 1 (0.9871 g, 2.28 mmol) and heptane (20 mL) were slowly added to the hot slurry then the reaction cooled to room temperature overnight. Then the solvent was removed under vacuum at 70° C. with slow stirring to yield 60.2 g of catalyst as yellow solid.

Polyoctene Screening.

Inside a glove box, a 60 mL jar was charged with 1-octene (30 mL), a thermocouple, and supported MAO (100 mg) then stirred in a Styrofoam insulated holder. While recording the temperature, a solution of PreCat 4 (4 umol) in toluene (1 mL) was added. The activity of the SMAO was gauged by the time required to reach maximum temperature.

Polyoctene polymerization data are reported in Table 1.

TABLE 1

| | | | | | | | |
|---|---|---|---|---|---|---|---|
| Polyoctene Screening Polymerization Data | | | | | | | |
| Example | SMAO | TMA | Heat | Heating Temp (° C.) | Heating Time (h) | Max Temp (° C.) | Time to Max (min) |
| POct-1 | Ex. 2a | Y | N | RT | 0 | 113.1 | 32.9 |
| POct-2 | Ex. 2b | N | N | RT | 0 | 106.2 | 35.1 |
| POct-3 | Ex. 2c | Y | Y | 90 | 1 | 120.5 | 17.7 |
| POct-4 | Ex. 2d | N | Y | 90 | 1 | 106.5 | 37.4 |
| POct-5 | Ex. 2e | Y | Y | 90 | 1 | 115.8 | 24.3 |
| POct-6 | Ex. 3a | N | N | RT | 0 | 86.6 | 77.1 |
| POct-7 | Ex. 3b | N | Y | 70 | 1 | 85.7 | 79.6 |
| POct-8 | Ex. 3c | N | Y | 80 | 1 | 84.9 | 70.5 |
| POct-9 | Ex. 3d | N | Y | 90 | 1 | 88.2 | 67.3 |
| POct-10 | Ex. 3e | N | Y | 100 | 1 | 90.5 | 68 |
| POct-11 | Ex. 4a | Y | Y | 70 | 1 | 114.3 | 30.1 |
| POct-12 | Ex. 4b | Y | Y | 80 | 1 | 116.4 | 21.6 |
| POct-13 | Ex. 4c | Y | Y | 90 | 1 | 123.3 | 22.3 |
| POct-14 | Ex. 4d | Y | Y | 100 | 1 | 112.8 | 34 |
| POct-15 | Ex. 4e | Y | Y | 70 | 3 | 121.6 | 21.1 |
| POct-16 | Ex. 4f | Y | Y | 80 | 3 | 119.1 | 24.4 |
| POct-17 | Ex. 4g | Y | Y | 90 | 3 | 122.5 | 25.6 |
| POct-18 | Ex. 4h | Y | Y | 100 | 3 | 109.2 | 49.12 |
| POct-19 | Ex. 5 | Y | Y | 70 | 5 | 123.9 | 25.2 |

Salt Bed Gas-Phase Polymerization Screening

A 2 L autoclave was charged, under $N_2$, with dry NaCl (350 g), TIBAL-SiO$_2$ scavenger (4.6 g of 1.85 mmol TIBAL/g ES70(100)) scavenger and heated for 30 minutes at 120° C. The reactor was cooled to −81° C. 1-Hexene (1.5 mL) and 10% $H_2$ in $N_2$ (85 sccm) were added then the stirring was commenced (450 RPM). Solid catalyst (~10 mg) was injected into the reactor with ethylene (+220 psia). After the injection, the reactor temperature was controlled at 85° C. and ethylene allowed to flow into the reactor to maintain pressure. Both $H_2$ in $N_2$, and hexene were fed in ratio to the ethylene flow. The polymerization was halted after 60 minutes by venting the reactor, with the exception of Pol 2 which was stopped after 3 hours. The polymer was washed with water to remove salt then dried.

Salt Bed Gas-Phase Polymerization examples Pol1-Pol5 are reported in Table 2.

TABLE 2

| | | | | | | | | |
|---|---|---|---|---|---|---|---|---|
| Lab Salt Bed Polymerization Data | | | | | | | | |
| Example | Catalyst | MCN | 10% $H_2$ Charge (sccm) | $H_2$/$C_2$ Feed (mg/g) | $C_6$ Charge (mL) | $C_6$/$C_2$ Feed (g/g) | Catalyst (mg) | Productivity (g Pol/g cat h) |
| Pol-1 | Ex. 5a | PreCat 1 | 85 | 0.25 | 1.5 | 0.06 | 11.4 | 6,044 |
| Pol-2 | Ex. 5a | PreCat 1 | 70 | 0.2 | 3 | 0.2 | 11.5 | 9,156 |
| Pol-3 | Ex 5b | PreCat 2 | 85 | 0.25 | 1.5 | 0.06 | 13.7 | 7,803 |
| Pol-4 | Ex 5c | PreCat 3 | 120 | 0.5 | 2.5 | 0.1 | 11.3 | 4,327 |
| Pol-5 | Ex. 6 | PreCat 1 | 85 | 0.25 | 1.5 | 0.06 | 11.3 | 4,239 |

The results in Table 2 demonstrate that the catalyst produce the polymer LLDPE with high productivity.

In some embodiments, the productivity of the catalyst is at least about 1,000 gPgcat$^{-1}$ hr$^{-1}$, such as from about 1,000 gPgcat$^{-1}$ hr$^{-1}$ to about 30,000 gPgcat$^{-1}$ hr$^{-1}$, such as from about 2,000 gPgcat$^{-1}$ hr$^{-1}$ to about 5,000 gPgcat$^{-1}$ hr$^{-1}$, such as from about 4,000 gPgcat$^{-1}$ hr$^{-1}$ to about 5,000 gPgcat$^{-1}$ hr$^{-1}$, alternatively from about 4,000 gPgcat$^{-1}$ hr$^{-1}$ to about 10,000 gPgcat$^{-1}$ hr$^{-1}$, such as from about 6,000 gPgcat$^{-1}$ hr$^{-1}$ to about 8,000 gPgcat$^{-1}$ hr$^{-1}$, alternatively from about 8,000 gPgcat$^{-1}$ hr$^{-1}$ to about 10,000 gPgcat$^{-1}$ hr$^{-1}$, such as from about 8,000 gPgcat$^{-1}$ hr$^{-1}$ to about 9,000 gPgcat$^{-1}$ hr$^{-1}$.

All documents described herein are incorporated by reference herein, including any priority documents and/or testing procedures to the extent they are not inconsistent with this text. As is apparent from the foregoing general description and the specific embodiments, while some embodiments have been illustrated and described, various modifications can be made without departing from the spirit and scope of the disclosure. Accordingly, it is not intended that the disclosure be limited thereby. Likewise, the term "comprising" is considered synonymous with the term "including." Likewise whenever a composition, an element or a group of elements is preceded with the transitional phrase "comprising", it is understood that we also contemplate the same composition or group of elements with transitional phrases "consisting essentially of," "consisting of", "selected from the group of consisting of," or "is" preceding the recitation of the composition, element, or elements and vice versa.

While the present disclosure has been described with respect to a number of embodiments and examples, those skilled in the art, having benefit of this disclosure, will appreciate that other embodiments can be devised which do not depart from the scope and spirit of the present disclosure.

What is claimed is:

1. A method comprising:
contacting a support material including absorbed water with trimethylaluminum (TMA) in an aliphatic hydrocarbon;
removing the aliphatic hydrocarbon by distillation at a pressure greater than or equal to 0.5 atm;
heating, at a temperature ranging from about 25° C. to about 200° C., a reaction product of the support material and the TMA in a presence of TMA, wherein the TMA includes TMA in an amount of about 2-10 mmol TMA per gram of the support material in excess of an amount that reacts with the support material absorbed with water;
impregnating the support material with about 2-10 mmol water per gram of the support material; and
removing excess TMA.

2. The method of claim 1, further comprising producing a supported methylaluminoxane without detectable toluene.

3. The method of claim 1, wherein the impregnating comprises impregnating the support material with about 2-6 mmol water per gram of the support material, and wherein the heating comprises heating at the temperature ranging from about 70° C. to about 100° C.

4. The method of claim 1, wherein the aliphatic hydrocarbon is pentane.

5. The method of claim 1 further comprising, prior to the heating step, bringing a temperature of the reaction product of the support material and the TMA to about 23° C.

6. The method of claim 1, wherein an amount of TMA on the support material is from 1.0 mmol TMA per gram of support to 12 mmol TMA per gram of support.

7. The method of claim 1, further comprising:
generating a supported methylaluminoxane; and
generating a catalyst system by introducing a catalyst compound to the supported methylaluminoxane.

8. The method of claim 7, wherein the catalyst compound is a metallocene.

9. The method of claim 7, wherein the catalyst compound is not a metallocene.

10. The method of claim 7, further comprising generating a polymer from the catalyst system.

11. The method of claim 1, wherein the removing the aliphatic hydrocarbon is performed before or after the heating of the reaction product.

12. The method of claim 1, wherein the aliphatic hydrocarbon has a boiling point less than or equal to 120° C.

13. A method comprising:
contacting a support material including absorbed water with trimethylaluminum (TMA) in an aliphatic hydrocarbon;
removing the aliphatic hydrocarbon by distillation at a pressure greater than or equal to 0.5 atm;
heating, at a temperature ranging from about 25° C. to about 200° C., a reaction product of the support material and the TMA in a presence of TMA, wherein the TMA includes TMA in an amount of about 2-10 mmol TMA per gram of the support material in excess of an amount that reacts with the support material absorbed with water; and
removing excess TMA, wherein the contacting is performed at a temperature less than or equal to −5° C. with the support material being a silica, dehydrated at greater than or equal to 600° C., that includes 2-6 mmol absorbed water per gram silica, and wherein the heating is performed at a temperature ranging from about 70° C. to 90° C., with an excess amount of the TMA of about 7 mmol per gram silica.

* * * * *